United States Patent [19]
Takemoto

[11] Patent Number: 5,638,089
[45] Date of Patent: Jun. 10, 1997

[54] COORDINATIVE DETECTING METHODS AND APPARATUS FOR LIQUID CRYSTAL DISPLAY UNIT AND LIQUID CRYSTAL INTEGRAL TYPE TABLET

[75] Inventor: Masato Takemoto, Ayama-gun, Japan

[73] Assignee: Sharp Kabushiki Kaisha, Osaka, Japan

[21] Appl. No.: 320,194

[22] Filed: Oct. 7, 1994

[30] Foreign Application Priority Data

Dec. 24, 1993 [JP] Japan ................... 5-328081

[51] Int. Cl.$^6$ ........................................... G09G 3/36
[52] U.S. Cl. ................ 345/104; 345/87; 345/103; 345/201
[58] Field of Search ................ 345/87, 103, 104, 345/201

[56] References Cited

U.S. PATENT DOCUMENTS

| | | | |
|---|---|---|---|
| 3,818,482 | 6/1974 | Yoshida | 345/201 |
| 4,824,212 | 4/1989 | Taniguchi | 345/103 |
| 5,347,294 | 9/1994 | Usui et al. | 345/89 |
| 5,357,266 | 10/1994 | Tagawa | 345/104 |
| 5,392,058 | 2/1995 | Tagawa | 345/103 |
| 5,457,482 | 10/1995 | Rhoden | 345/201 |

FOREIGN PATENT DOCUMENTS

| | | |
|---|---|---|
| 0 513 792 A2 | 5/1992 | European Pat. Off. . |
| 3-296127 | 12/1991 | Japan . |
| 4-310995 | 2/1992 | Japan .................. 345/104 |

*Primary Examiner*—Richard Hjerpe
*Assistant Examiner*—Vui T. Tran
*Attorney, Agent, or Firm*—David G. Conlin; Brian L. Michaelis

[57] ABSTRACT

A coordinate detecting method for a liquid crystal display unit has the steps of generating a second display control signal for controlling a display provided in a display period and a non-display period on the basis of a first display control signal set such that one frame is constructed by only the display period; the display period and the non-display periods being set such that an image is displayed on a liquid crystal panel in the display period and is not displayed on the liquid crystal panel in the non-display period; storing transmitted image data to a memory in accordance with timings shown by the first display control signal; reading these stored image data from the memory in accordance with timings shown by the second display control signal; displaying the image on the liquid crystal panel by the read image data and the second display control signal; and detecting coordinates by a detecting pen in the non-display period. A coordinate detecting method and an apparatus for a liquid crystal integral type tablet is also shown.

10 Claims, 16 Drawing Sheets

COORDINATIVE DETECTING METHODS AND APPARATUS FOR LIQUID CRYSTAL DISPLAY UNIT AND LIQUID CRYSTAL INTEGRAL TYPE TABLET

BACKGROUND OF THE INVENTION

1. Field of the Invention

The present invention relates to a liquid crystal display unit for displaying an image based on a display control signal showing timings having non-display period. The present invention also relates to a tablet of a liquid crystal integral type in which a display period and a non-display period are formed as timings of a display control signal. More particularly, the present invention relates to a method for detecting coordinates by a detecting pen.

2. Description of the Related Art

There is a device of a liquid crystal display integral type as one kind of device able to display an image by using a liquid crystal and input data by a pen. In this liquid crystal display integral type device, a coordinate detecting period for providing a non-display of the image is formed to detect coordinates by using a detecting pen between frames for performing a liquid crystal displaying operation (see FIG. 5). This non-display period is a period corresponding to a vertical retrace line period in a CRT display. In this period, a scanning voltage for detecting coordinates is sequentially applied to each of display electrodes in an array direction thereof every display electrode at each of X and Y coordinates. The X and Y coordinates are detected from timings in which a voltage is induced by electrostatic induction in the detecting pen coming in contact with a liquid crystal panel.

FIG. 1 is a block diagram showing the electric construction of a liquid crystal display integral type unit in accordance with a general technique.

In this general liquid crystal display unit, column electrodes X1 to Xm and row electrodes Y1 to Yn are arranged in a liquid crystal panel 1. The column electrodes X1 to Xm are operated by a segment driving circuit 3. The row electrodes Y1 to Yn are operated by a common driving circuit 2.

A display control circuit 5 forms a circuit block for generating display data transmitted to the liquid crystal panel 1 and various kinds of timing signals. A display period and a non-display period for detecting coordinates are formed in timings of these timing signals. A position detecting control circuit 6 outputs a pulse for detecting coordinates. One of outputs of these control circuits 5 and 6 is selected by a switching circuit 4 and is outputted from the switching circuit 4 to the segment driving circuit 3 and the common driving circuit 2. A control circuit 7 controls various kinds of timings when coordinates are detected.

A small coordinate detecting signal induced by the detecting pen 8 is amplified by an amplifier 9 and is transmitted to an X-coordinate detecting circuit 10 and a Y-coordinate detecting circuit 11. The X-coordinate detecting circuit 10 and the Y-coordinate detecting circuit 11 respectively transmit an X-coordinate output and a Y-coordinate output based on a counter output from the control circuit 7. A direct current power source circuit 12 supplies power for a liquid crystal display to each of the common driving circuit 2 and the segment driving circuit 3.

A coordinate detecting principle will first be explained before an operation of the general liquid crystal display unit having the above construction is concretely explained.

The coordinate detecting period as a non-display display period is divided into a scanning period of the column electrodes X1 to Xm and a scanning period of the row electrodes Y1 to Yn. As shown in FIG. 2, in each of the scanning periods, a scanning voltage is sequentially applied to the electrodes along an array direction thereof every each of the column electrodes X1 to Xm and the row electrodes Y1 to Yn in timings in which adjacent electrodes partially overlap each other.

FIG. 2 is an explanatory view typically showing these timings. This explanatory view does not strictly correspond to the operation of the general liquid crystal display unit shown in FIG. 1. In the general liquid crystal display unit, the X-coordinate is detected after the Y-coordinate is detected.

An electrode for detecting high impedance is arranged at an end tip of the detecting pen 8. Therefore, when the detecting pen 8 comes in contact with a display face as a detecting panel face, a small capacity is caused between an electrode in the liquid crystal panel and an electrode of the detecting pen 8 as shown in FIG. 3a.

Therefore, when a scanning voltage is applied to the panel electrode, a small voltage is induced by electrostatic induction in the electrode of the detecting pen 8 as shown in FIG. 3b. The induced voltage has a peak at a time point at which the scanning voltage is applied to an electrode located just below the detecting pen 8. Therefore, when the scanning voltage is sequentially applied to the electrodes from an electrode located in an end portion of the liquid crystal panel 1, a position of the detecting pen 8 is detected in timing in which the induced voltage is a peak as shown in FIG. 3c.

FIG. 4 shows timings of main signals in the general liquid crystal display unit. The operation of the general liquid crystal display unit will next be explained with reference to FIG. 4 in accordance with necessity.

In FIG. 4, four upper signals are outputs from the display control circuit 5. A signal S is a signal for determining a starting line of a frame. A signal CP1 is a signal showing synchronization in a row unit. Signals D0 to D3 show parallel data of 4 bits as display data. A signal CP2 is a signal for showing timings for latching the signals D0 to D3 to the segment driving circuit 3.

The number of column electrodes X1 to Xm is set to m as a positive integer and the signals D0 to D3 are constructed by 4 bits. Accordingly, the number of clock signals with respect to the signal CP2 on one line as a row is set to m/4. The number of lines as rows shown by the signal CP1 is set to (n+α) to secure a period for detecting coordinates by adding the number α of lines corresponding to the non-display period to the number n of lines indispensable to a display.

In FIG. 4, eight lower signals show signals including signals from the position detecting control circuit 6 and finally transmitted to the common driving circuit 2 and the segment driving circuit 3. A signal MODE is a signal for switching operating modes of the segment driving circuit 3 from a segment operating mode to a common operating mode.

In the segment operating mode, display data on one line are sequentially stored to an internal buffer and these stored display data are transmitted to the liquid crystal panel 1 in synchronization with input timing of a signal XCK shown in FIG. 1 at a stage at which all display data are arranged.

In contrast to this, the common operating mode is a mode for operating a shift register. Namely, while one bit data DI are sequentially shifted in accordance with the signal XCK, data of each of bits of the shift register are simultaneously transmitted to the liquid crystal panel 1 as parallel data.

As explained above, the segment driving circuit 3 is constructed such that the above two operating modes are executed because it is necessary to simultaneously transmit data on one line to the liquid crystal panel 1 so as to display an image and it is necessary to shift data from each other to detect coordinates. The signal MODE shown in FIG. 4 indicates the segment operating mode when this signal MODE shows a low voltage level (L level). In contrast to this, the signal MODE indicates the common operating mode when this signal MODE shows a high voltage level (H level).

A signal SY is a signal showing beginning of a frame in the display period and is equal to the signal S. A signal CP1Y is a shift clock signal for the common driving circuit 2 and is equal to the signal CP1 in the display period. A terminal SX is connected to an input terminal DI for the common operating mode of the segment driving circuit 3 shown in FIG. 1. No voltage of a signal SX at this terminal SX is changed from a low voltage level during the display period.

A signal Dout shows parallel data of 4 bits for a display and is basically equal to each of the signals D0 to D3 during the display period. However, a voltage level of this signal Dout is changed to a low voltage level so as to clear internal data within the segment driving circuit 3 when data are transmitted on a (n+1)-th line. A signal CP20 is a clock signal for latching the signal Dout and is equal to the signal CP2 in the display period.

From the above explanation, an image is displayed on the liquid crystal panel 1 during the display period in accordance with timings of various kinds of signals mentioned above.

An operation of the liquid crystal display unit in the coordinate detecting period will next be explained.

In a period for detecting a Y-coordinate, the voltage level of a signal SY transmitted to the common driving circuit 2 is set to a high voltage level. A clock signal is transmitted to a signal CP1Y in the same timing as the signal SY at this high voltage level.

At this time, the clock signal transmitted to the signal CP1Y is set to a clock signal having a maximum frequency within an allowable range of the operation of the common driving circuit 2. Further, the number of clock signals transmitted for the signal CP1Y is set to a clock number provided by adding a value n showing the number of lines as rows of the row electrodes Y1 to Yn to the number of clock signals transmitted during a period providing the high voltage level of the signal SY, and further adding one to this added number. A width of the signal SY at its high voltage level is determined by the number of electrodes for overlapping pulses for scanning with each other when coordinates are detected.

In contrast to this, in a period for detecting an X-coordinate, the voltage level of a signal MODE is set to a high voltage level and the operation of the segment driving circuit 3 is changed from the segment operating mode to the common operating mode. At this time, a signal SX shows input data of a shift register of the segment driving circuit 3. Further, a signal CP1X is set to a shift clock signal.

Namely, the operation of the liquid crystal display unit in the detecting period of the X-coordinate is similar to that in detecting period of the Y-coordinate. In this case, the signal SY is replaced with the signal SX and the signal CP1Y is replaced with the signal CP1X. Therefore, the number of clock signals for the signal CP1X is set to a clock number provided by adding a value m showing the number of columns of the column electrodes X1 to Xm to the number of clock signals transmitted during a period providing a high voltage level of the signal SX, and further adding one to this added number. A width of the signal SX at its high voltage level is determined by the number of electrodes for overlapping pulses for scanning with each other when coordinates are detected.

The voltage level of a signal FR for determining alternating timings of a voltage applied to the liquid crystal panel 1 is fixed in the above coordinate detecting periods. In FIG. 4, this voltage level of the signal FR is set to a low voltage level, but may be set to a high voltage level. Namely, the voltage level of the signal FR may be fixedly set to one of the low and high voltage levels. This is because, when a scanning pulse for the coordinate detection is changed to an alternating pulse during a scanning operation, a change in voltage of this pulse causes noises and reduces an accuracy in the coordinate detection.

The scanning pulse for the coordinate detection is applied to each of the row electrodes Y1 to Yn and the column electrodes X1 to Xm by each of the above-mentioned signals. The detecting pen 8 detects a small voltage caused by this scanning pulse. Each of X and Y coordinates is detected by the X-coordinate detecting circuit 10 and the Y-coordinate detecting circuit 11.

The above liquid crystal display unit in accordance with the general technique is a display unit having both a display function and a coordinate detecting function. There is another display unit using a liquid crystal panel which has a display function, but has no coordinate detecting function.

In this display unit, the switching circuit 4, the position detecting control circuit 8, the X-coordinate detecting circuit 10 and the Y-coordinate detecting circuit 11 are removed from the construction of the liquid crystal display unit shown in FIG. 1. The liquid crystal panel 1 has characteristics in which a better display can be obtained as a duty ratio is reduced. Therefore, all times of one frame are occupied by a scanning period for displaying an image. Namely, no detecting period shown in FIG. 5 is formed in this display unit. Accordingly, when a display period of one frame is terminated, a display period of the next frame is immediately started. Further, the segment driving circuit 3 has only a segment operating mode. The display control circuit 5 generates a control signal set in only the display period.

It is necessary to set a coordinate detecting period in the above display unit having no coordinate detecting function when the coordinate detecting function is added to this display unit. Therefore, it is necessary to change the construction of the existing display control circuit 5 for generating the control signal set in only the display period. Namely, no coordinate detecting function can be added to this display unit by only adding another circuit block to this display unit. Therefore, it is necessary to greatly change the display control circuit and change a transmitting speed of data for a display so that no existing construction of the display control circuit can be used as it is.

In contrast to this, when the liquid crystal display unit has the coordinate detecting function, the number of periods for detecting coordinates is set to one within one frame. A frame frequency is set to about 60 Hz to 80 Hz. Therefore, the coordinates are detected about 60 to 80 times for one second. Accordingly, when the detecting pen 8 is moved at a high speed, no moving locus of the detecting pen 8 is continuously detected so that problems are caused in a character input, etc.

SUMMARY OF THE INVENTION

It is therefore a first object of the present invention to provide a coordinate detecting method in a liquid crystal display unit in which a non-display period is secured by increasing a transmitting speed of data for displaying an image by using a memory for temporarily storing the image data, and the existing construction of a display control circuit can be used as it is by detecting coordinates in the secured non-display period.

A second object of the present invention is to provide a coordinate detecting method in a liquid crystal integral type tablet in which a coordinate detecting speed can be increased by setting a plurality of coordinate detecting periods within one frame.

In accordance with a first construction of the present invention, the above first object can be achieved by a coordinate detecting method in a liquid crystal display unit, comprising the steps of generating a second display control signal for controlling a display provided in a display period and a non-display period on the basis of a first display control signal set such that one frame is constructed by only the display period; the display period and the non-display periods being set such that an image is displayed on a liquid crystal panel in the display period and is not displayed on the liquid crystal panel in the non-display period; storing transmitted image data to a memory in accordance with timings shown by the first display control signal; reading these stored image data from the memory in accordance with timings shown by the second display control signal; displaying the image on the liquid crystal panel by the read image data and the second display control signal; and detecting coordinates by a detecting pen in the non-display period.

In accordance with a second construction of the present invention, the above second object can be achieved by a coordinate detecting method in a liquid crystal integral type tablet in which an image is displayed on a liquid crystal panel and coordinates are detected by a detecting pen when no image is displayed on the liquid crystal panel; the coordinate detecting method comprising the steps of dividing row electrodes arranged in the liquid crystal panel into a plurality of electrode groups constructed by continuous row electrode groups; forming a non-display period for undisplaying the image on the liquid crystal panel every time a display period for displaying the image by the electrode groups is terminated; and detecting coordinates by the detecting pen in this non-display period.

The next description relates to operating contents of the coordinate detecting method in the liquid crystal display unit having the first construction of the present invention.

The first display control signal is a signal for controlling a display for the liquid crystal display unit in which it is not necessary to detect coordinates. One frame is occupied by the display period with respect to the first display control signal. In this liquid crystal display unit, image data are transmitted in accordance with timings shown by the first display control signal.

It is necessary to secure the non-display period so as to obtain a period for detecting coordinates from the first display control signal and the image data. Therefore, the second display control signal provided in the display period for displaying an image on the liquid crystal panel and the non-display period for undisplaying the image on the liquid crystal panel is generated on the basis of the first display control signal. Further, timings are converted by using a memory so that image data are transmitted in accordance with timings of the second display control signal from timings of the first display control signal.

Thus, the image is displayed by these image data on the liquid crystal panel so that the non-display period is secured. Therefore, coordinates are detected by the detecting pen in the secured non-display period.

The next description relates to operating contents of the coordinate detecting method in the liquid crystal integral type tablet having the second construction of the present invention.

The row electrodes arranged in the liquid crystal panel are divided into a plurality of electrode groups composed of continuous row electrode groups. When an image is displayed by each of the electrode groups, a display period is divided in accordance with the number of electrode groups. Therefore, a non-display period for detecting coordinates by the detecting pen can be formed when each of divided display periods is terminated.

For example, when the row electrodes are divided into two electrode groups, the display period is divided into two divisional display periods. Therefore, two non-display periods are formed in one frame so that coordinates are detected by the detecting pen in each of the non-display periods. Namely, the coordinates are detected twice in one frame.

Further objects and advantages of the present invention will be apparent from the following description of the preferred embodiments of the present invention as illustrated in the accompanying drawings.

Figure 3A:
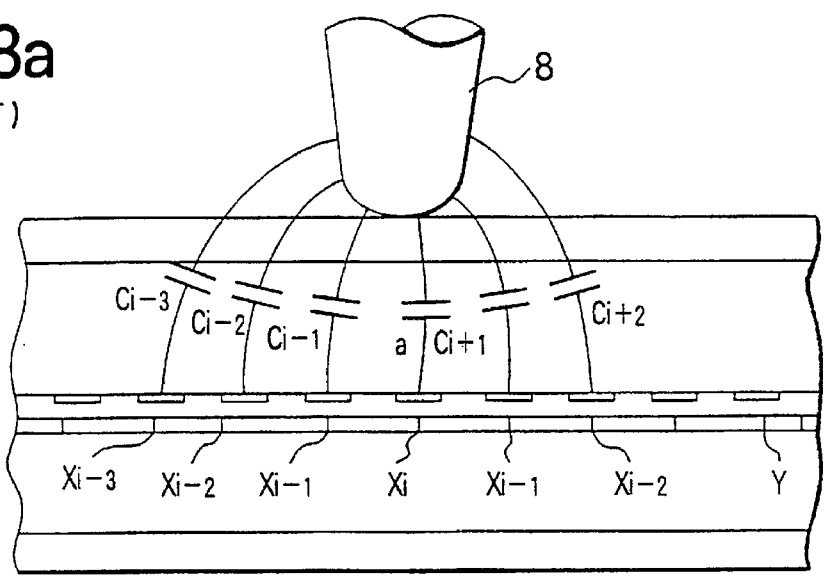
Figure 3B:
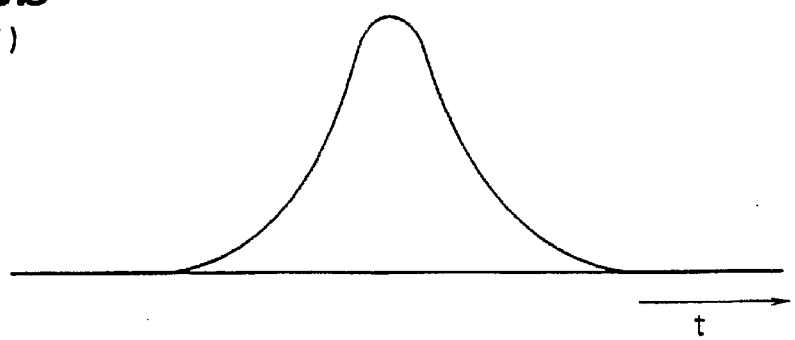
Figure 3C:
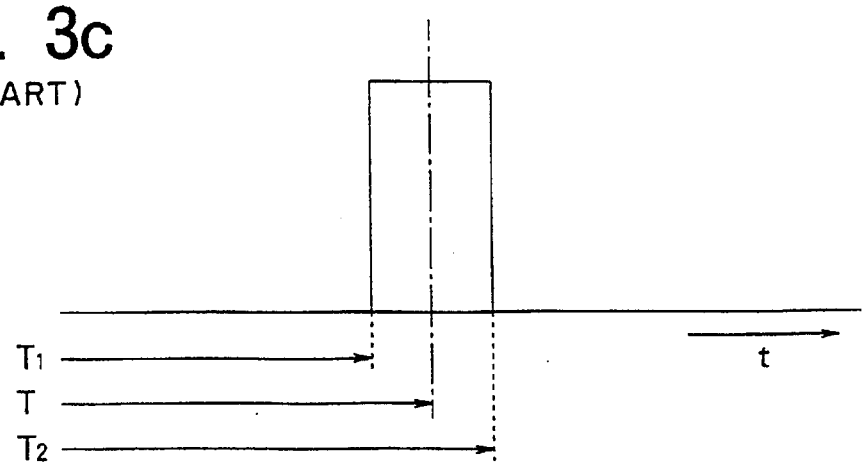
Figure 4:
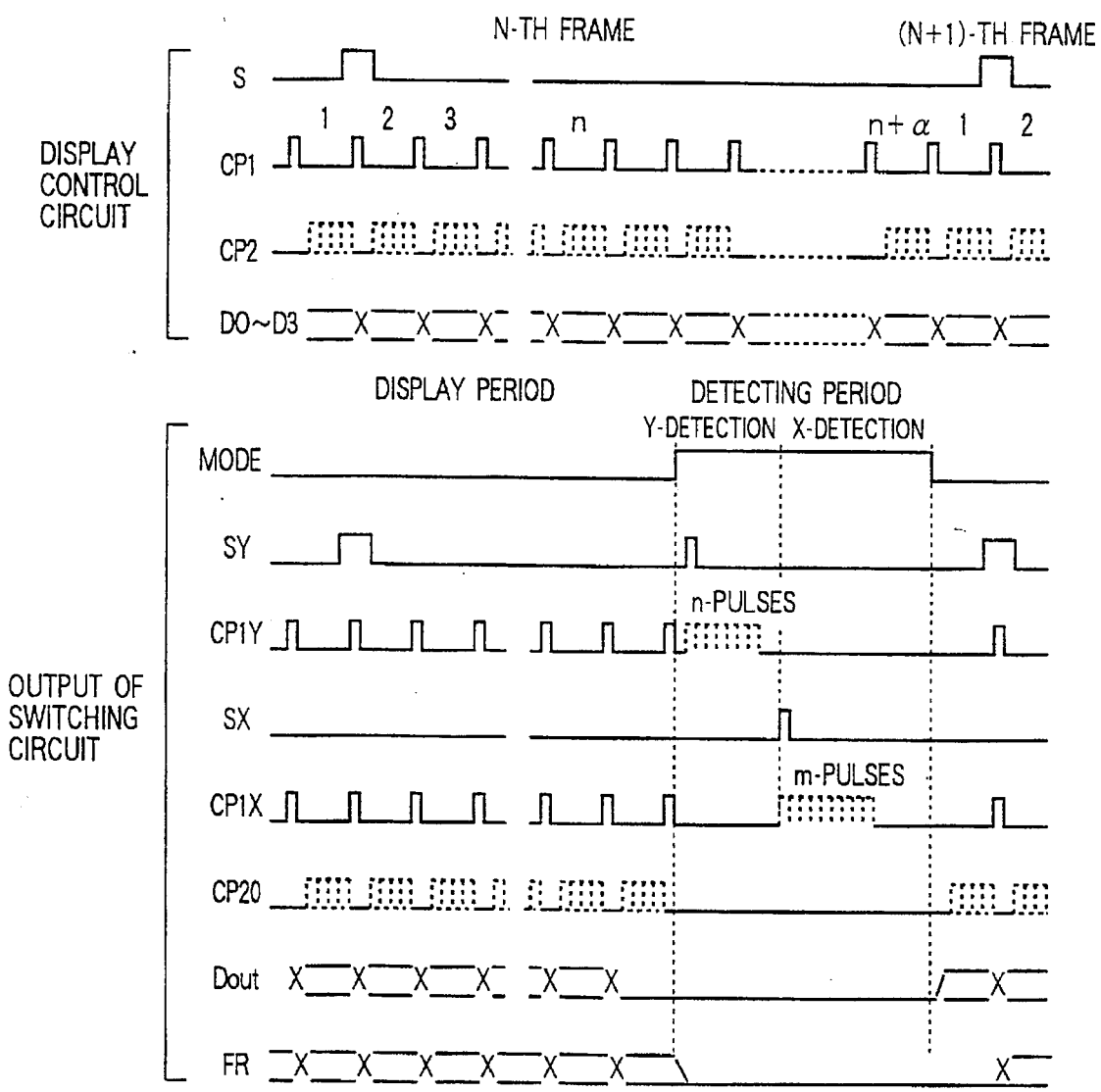
Figure 5:
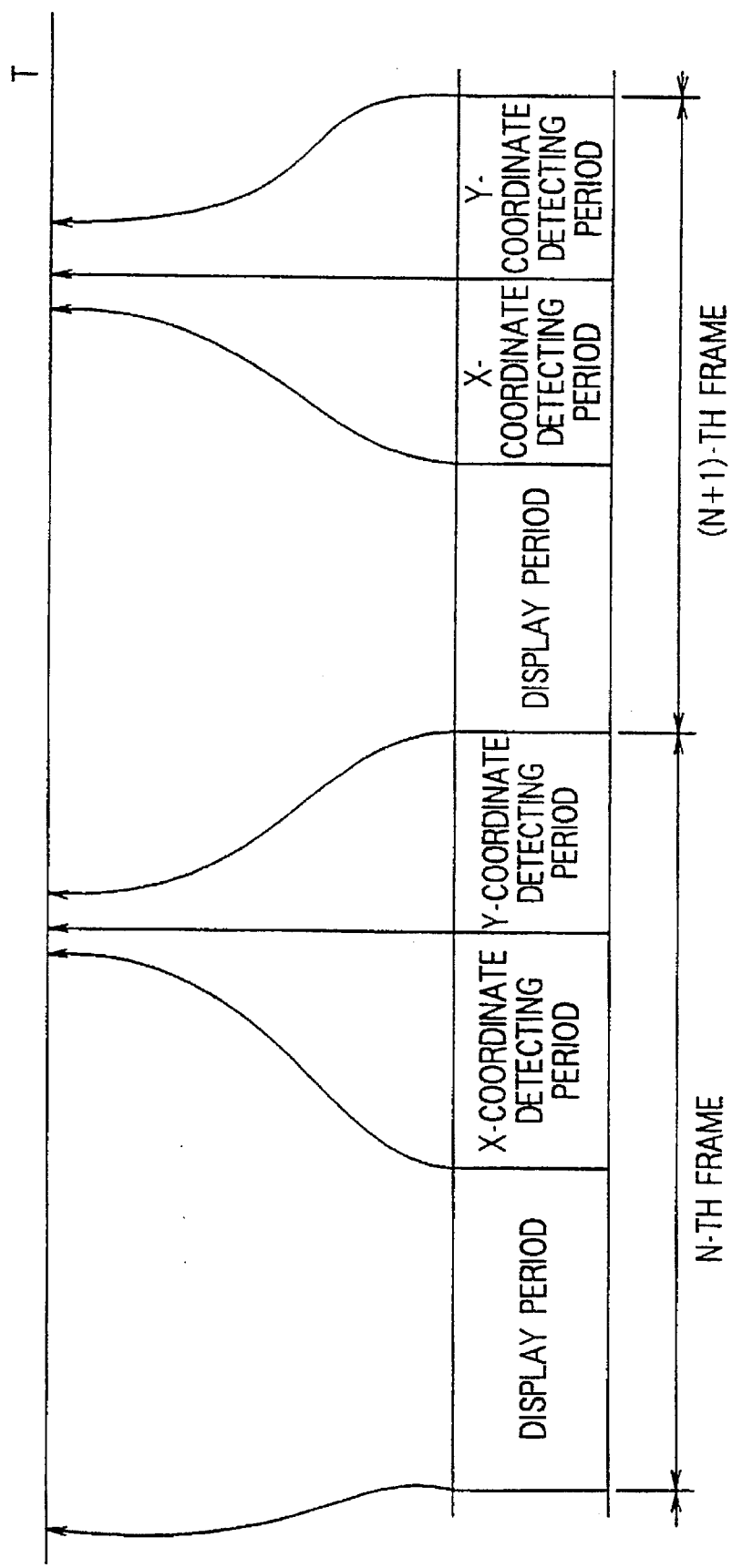
Figure 6:
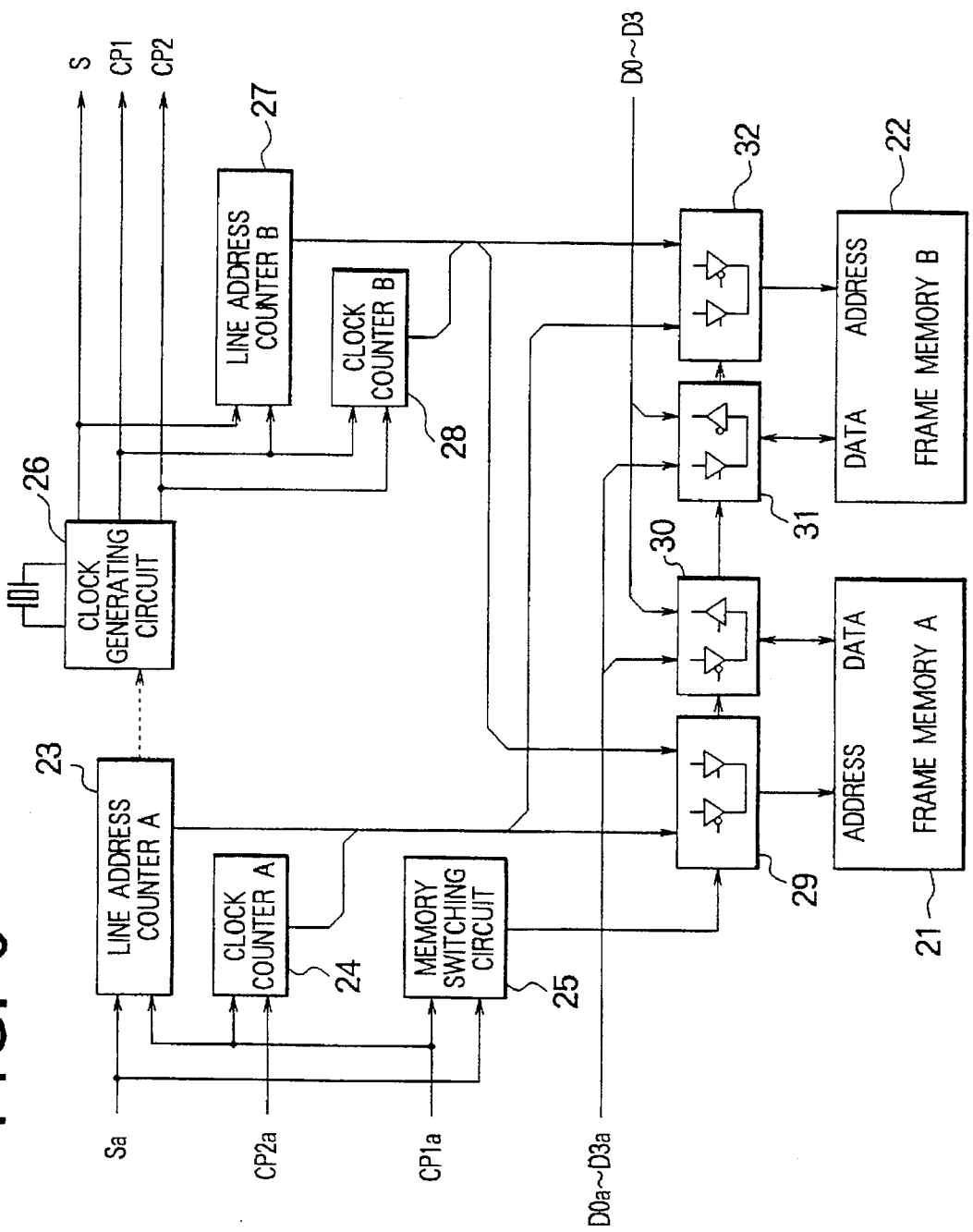
Figure 7:
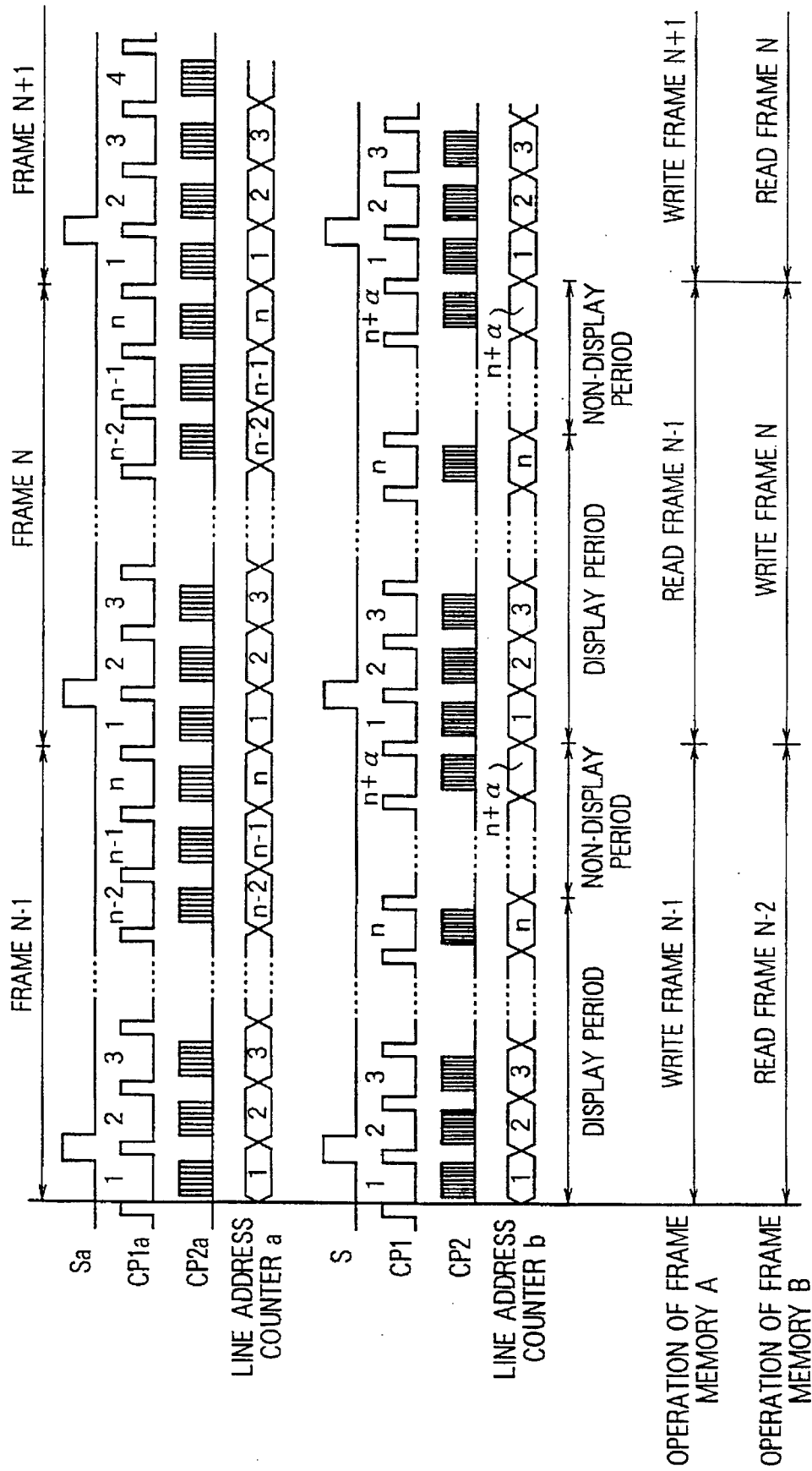
Figure 8:
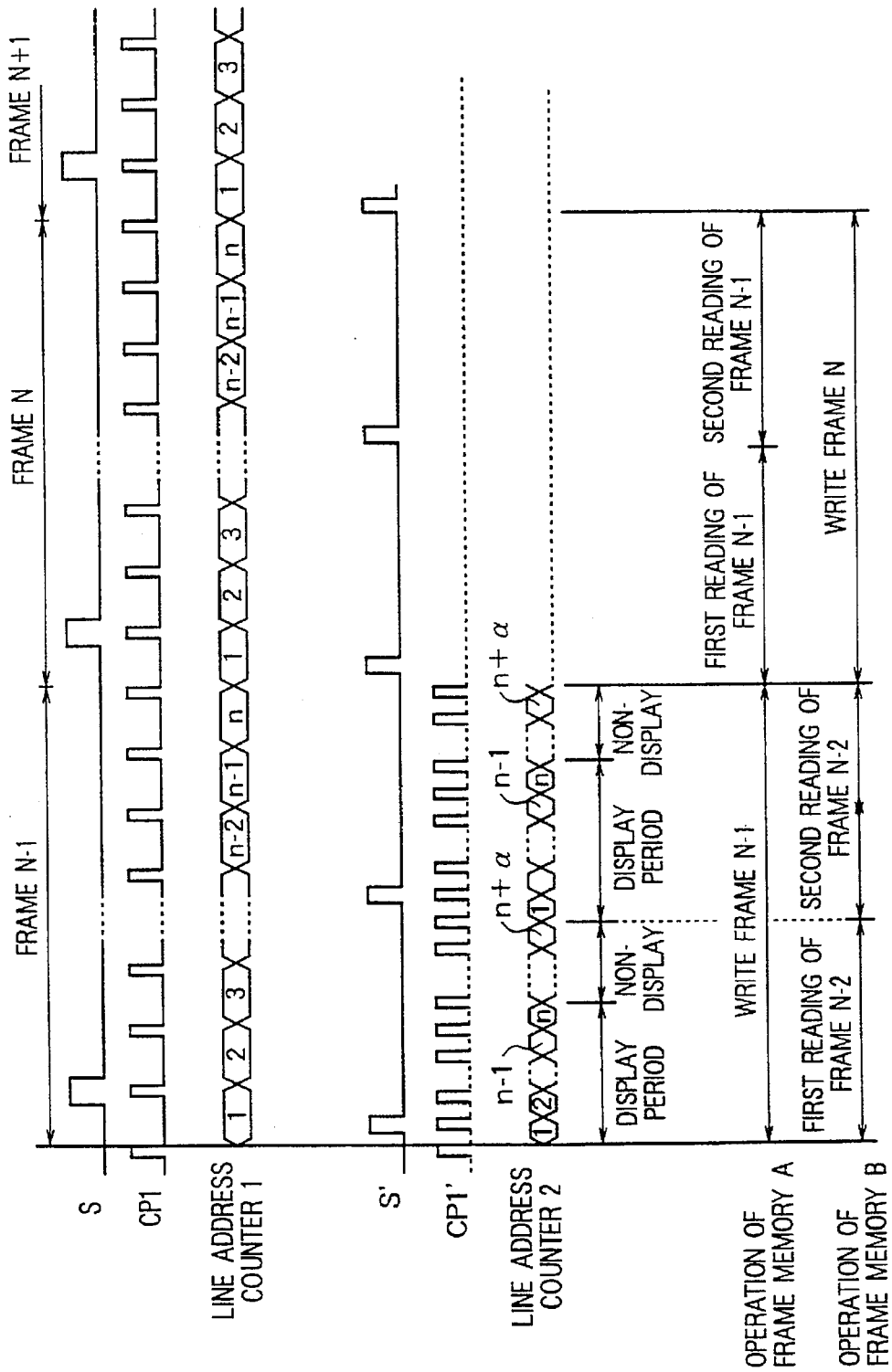
Figure 9:
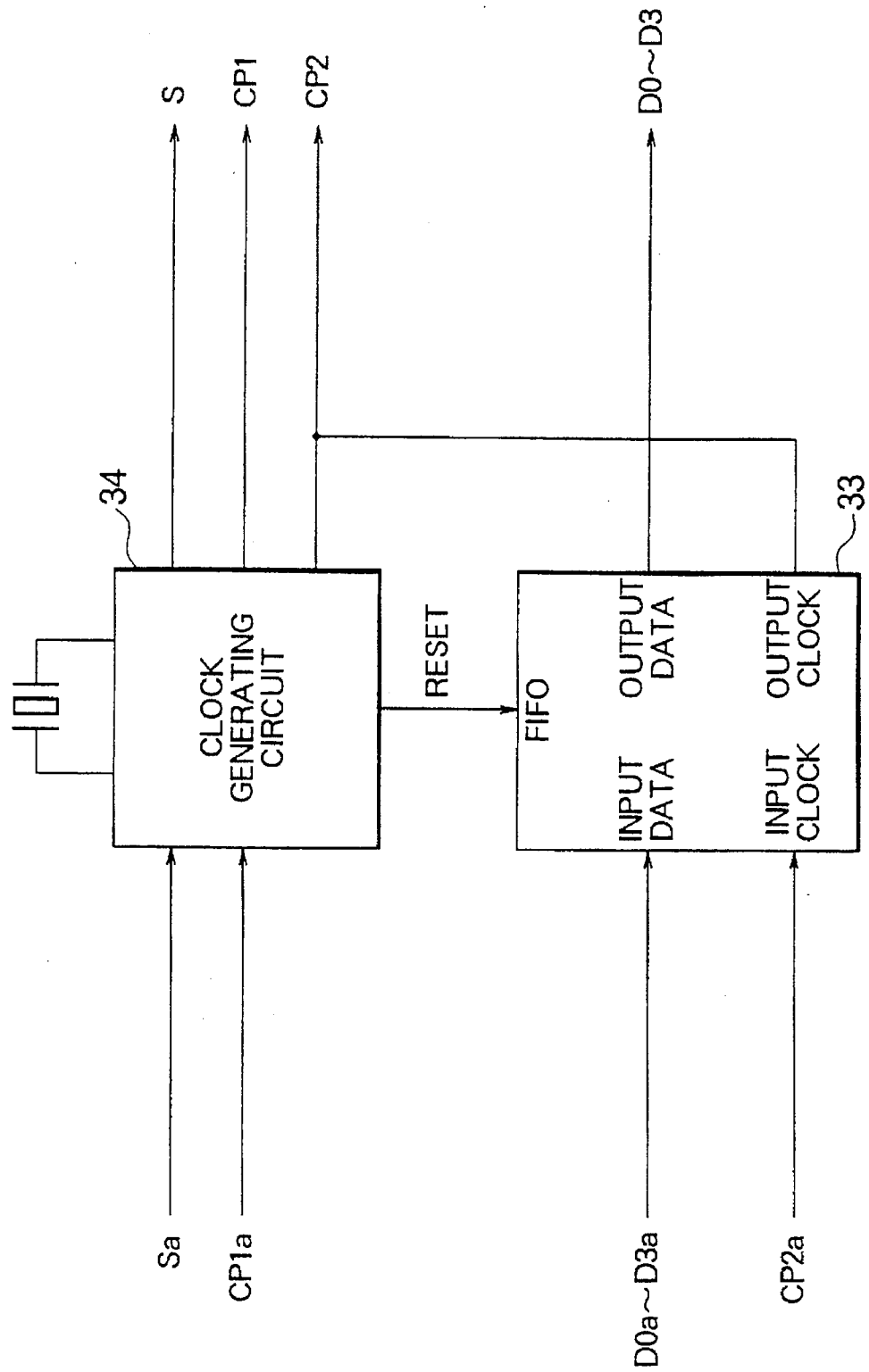
Figure 10:
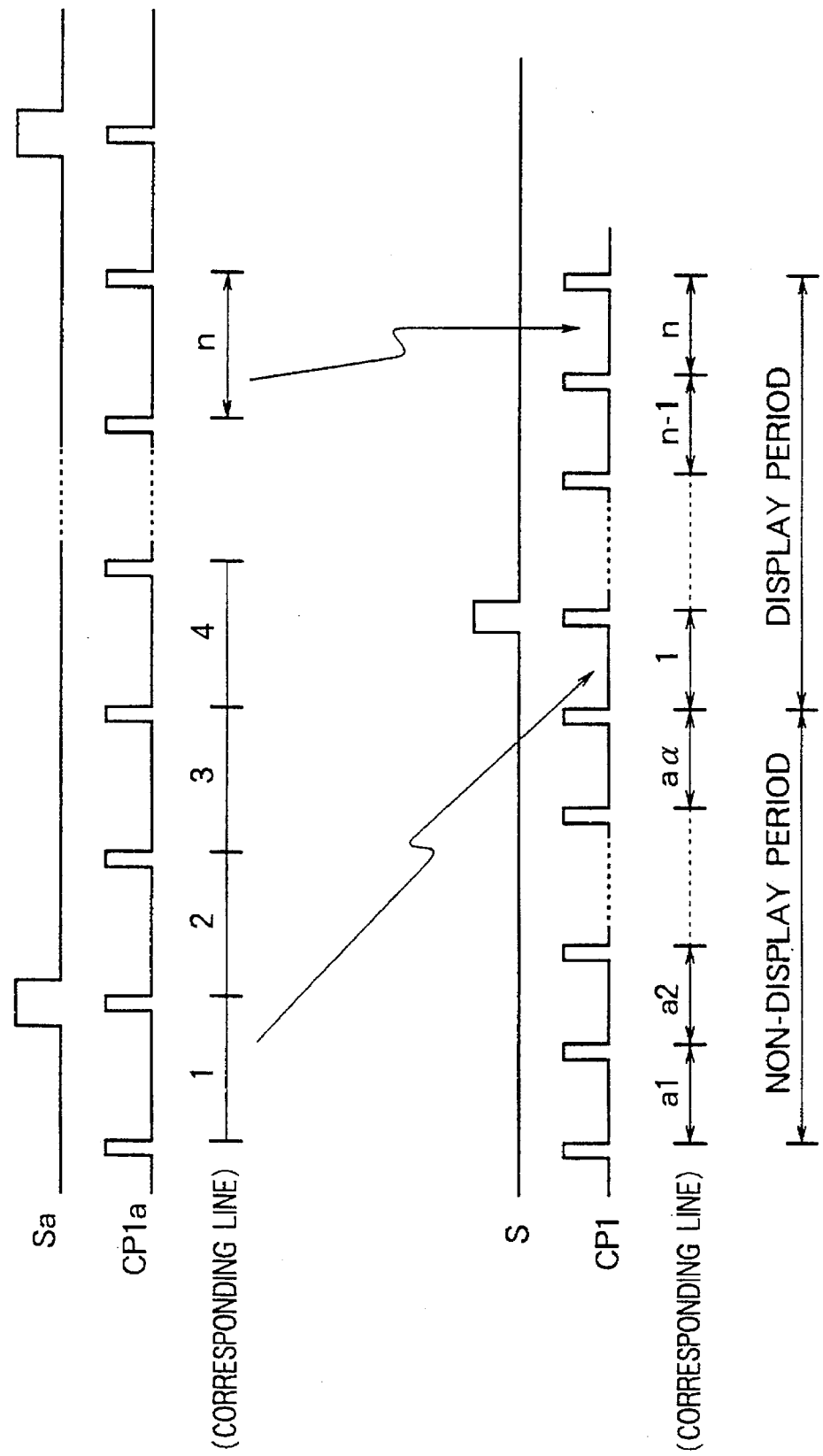
Figure 11:
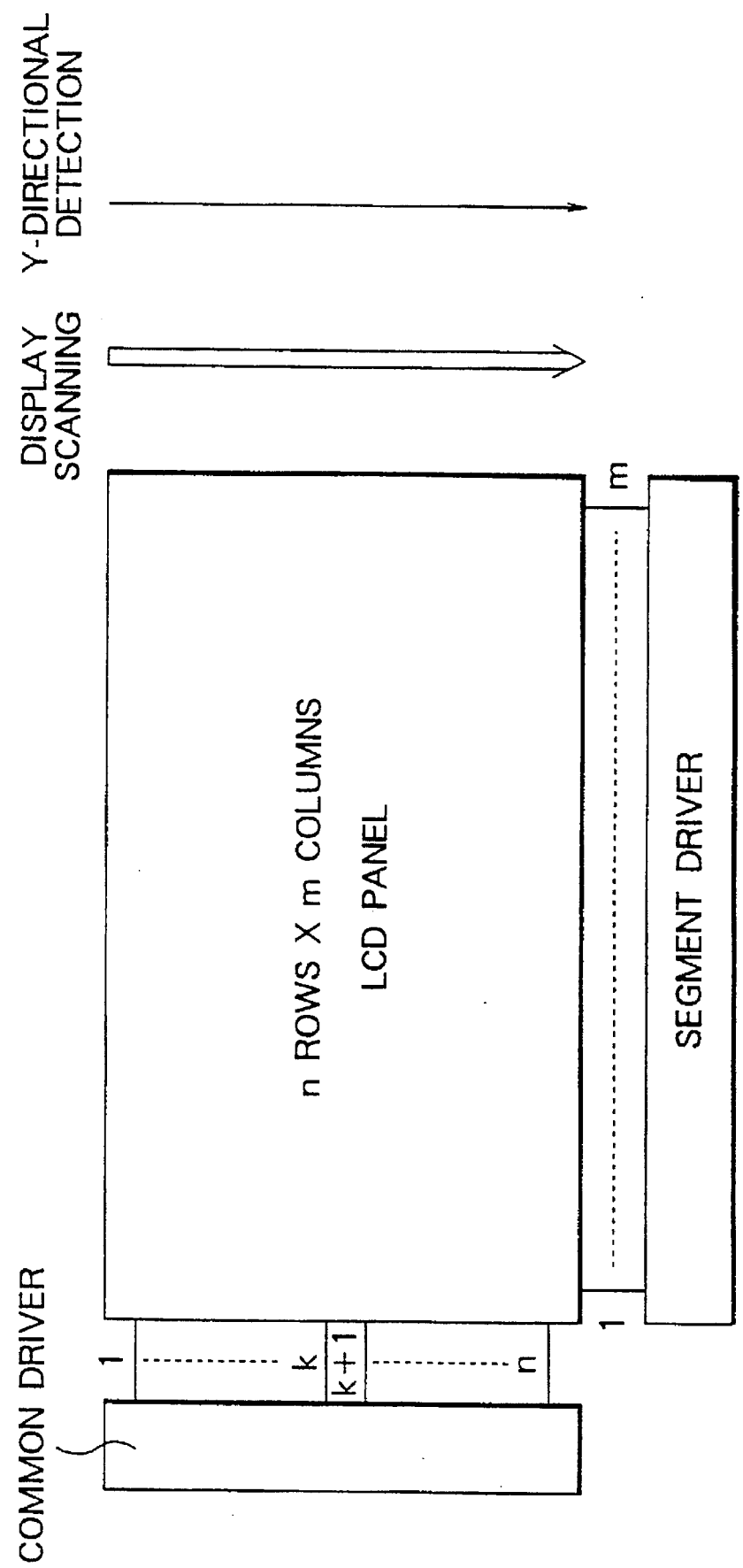
Figure 12:
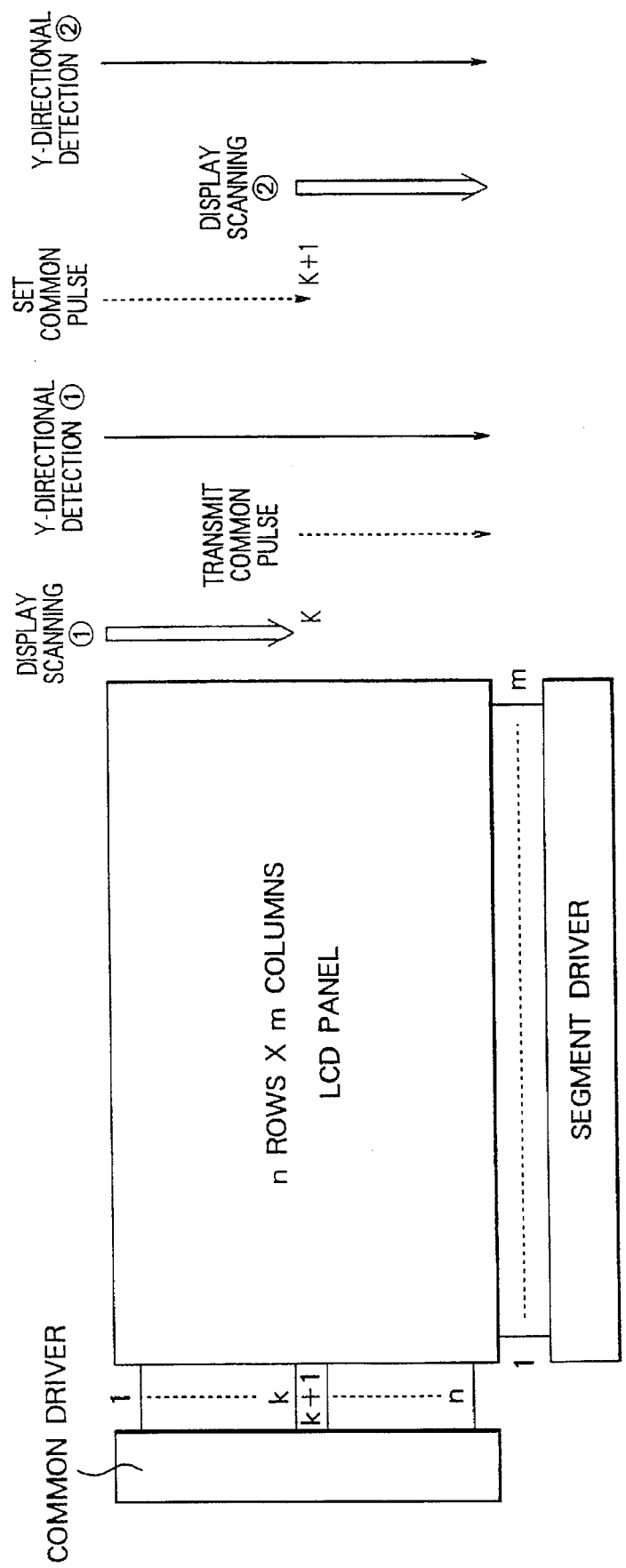
Figure 13:
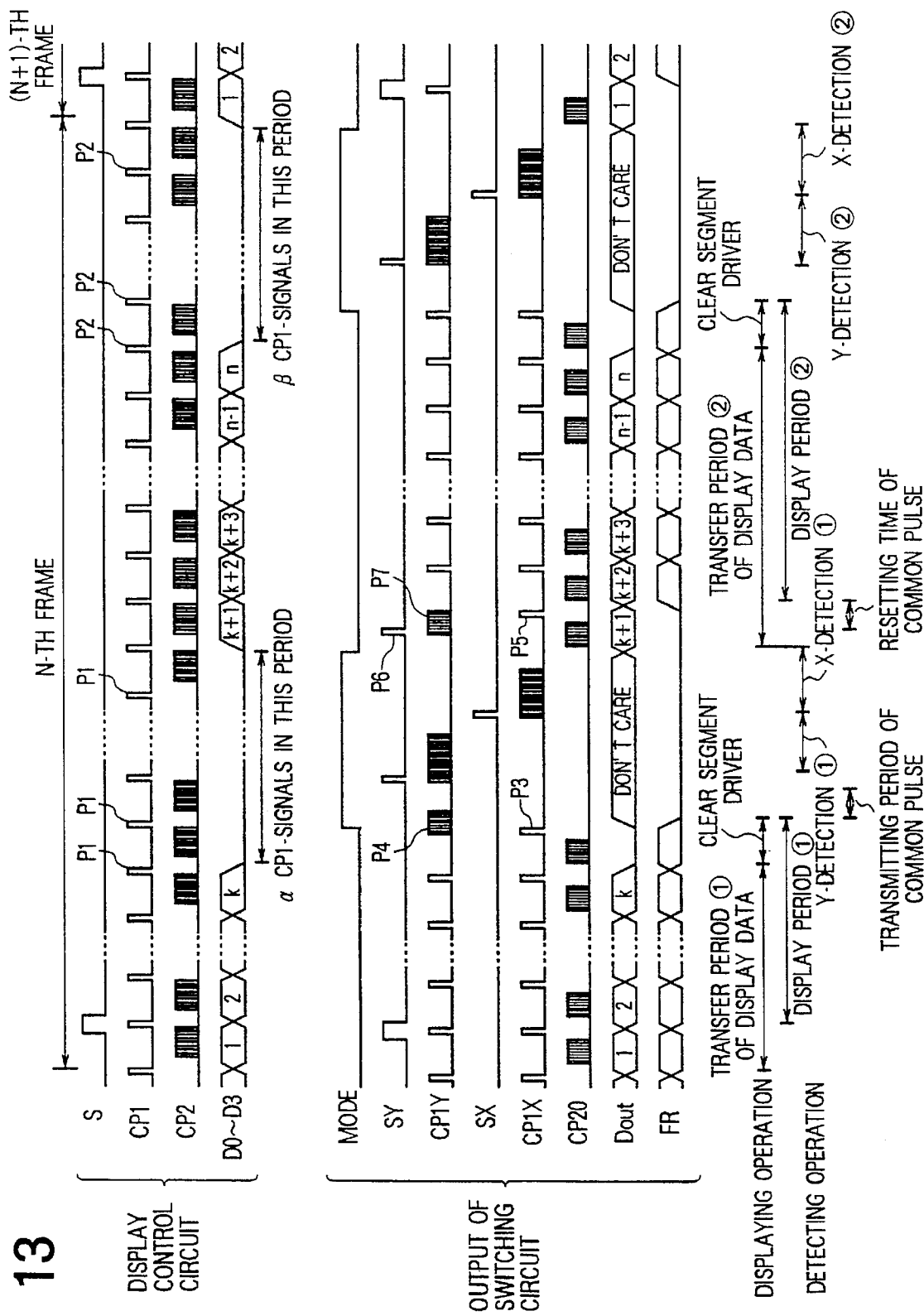
Figure 14:
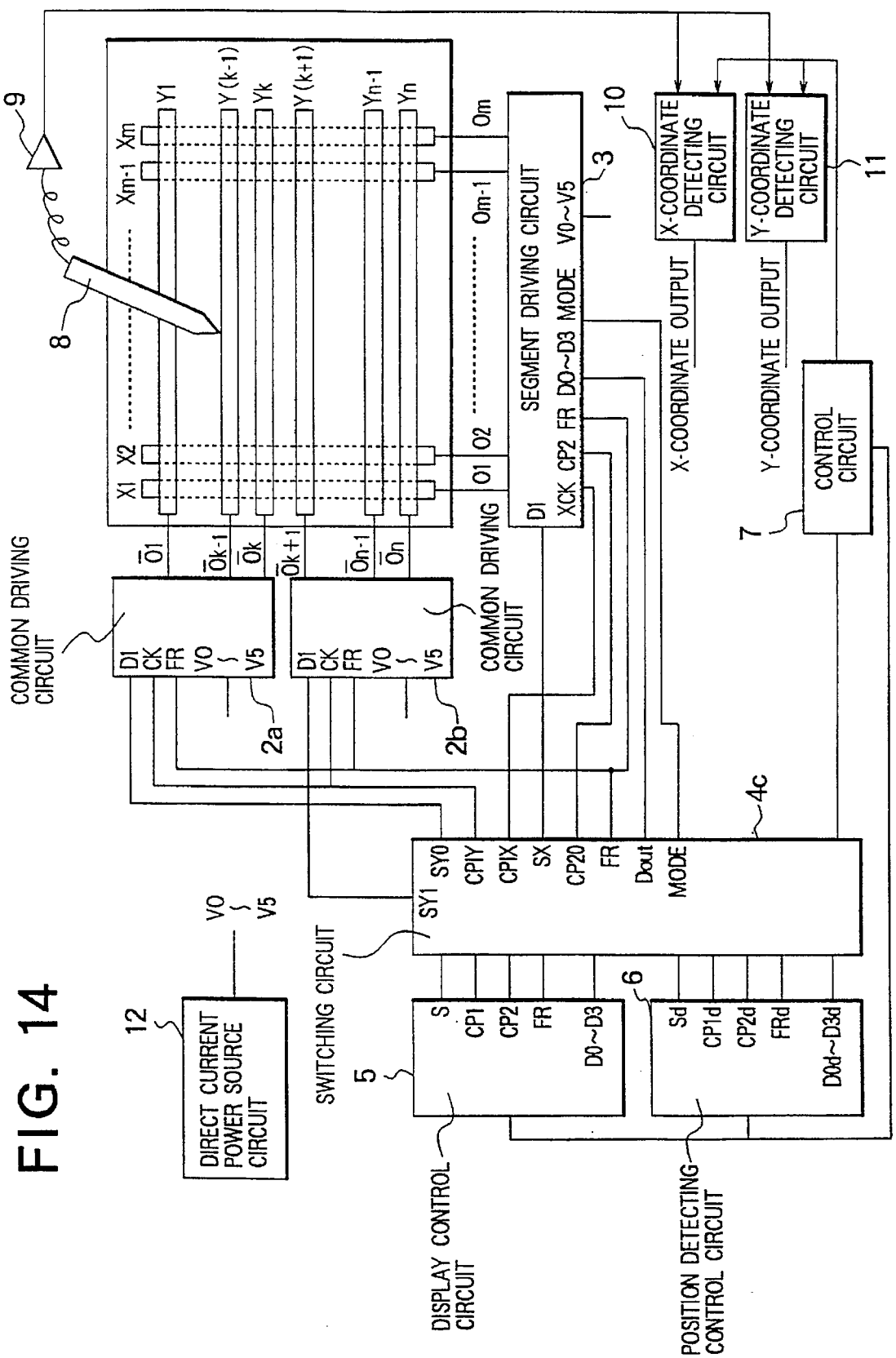
Figure 15:
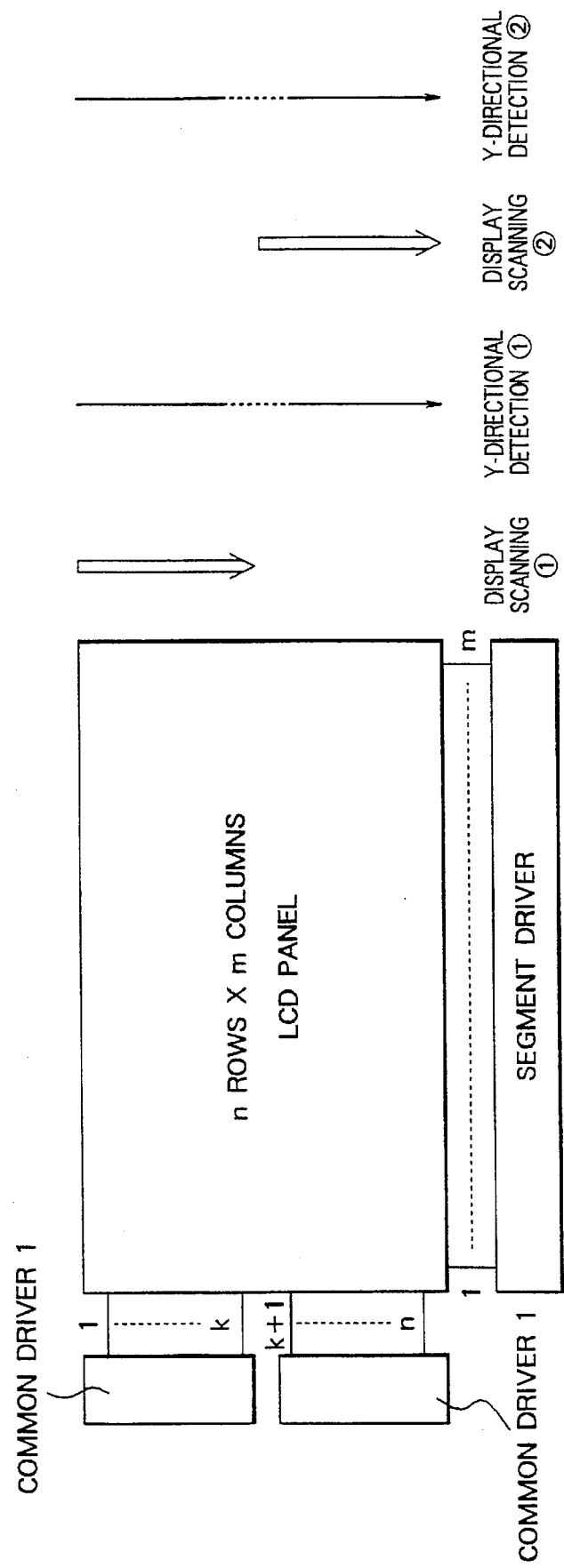
Figure 16:
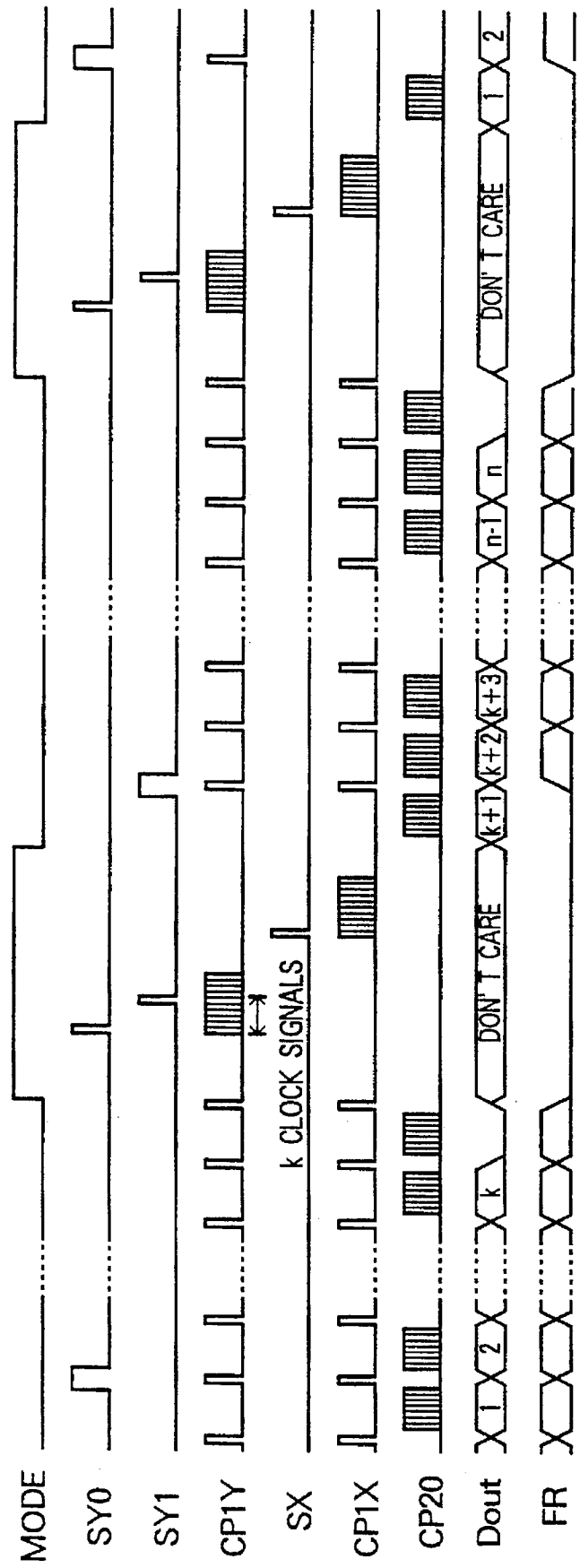

each of FIGS. 3a to 3c is an explanatory view showing a position detecting operation using a detecting pen;

FIG. 4 is a timing chart showing timings of main signals in the liquid crystal display unit using the general technique;

FIG. 5 is an explanatory view showing the relation between a display period and a coordinate detecting period in the liquid crystal display unit using the general technique;

FIG. 6 is a block diagram showing the electric construction of a circuit block arranged within a display control circuit to which a coordinate detecting method in accordance with a first embodiment of the present invention is applied in a liquid crystal display unit having first construction of the present invention;

FIG. 7 is a timing chart showing timings of main signals in the circuit block shown in FIG. 6;

FIG. 8 is a timing chart showing timings of main signals in a coordinate detecting method in accordance with a second embodiment of the present invention in the liquid crystal display unit having the first construction;

FIG. 9 is a block diagram showing the electric construction of a circuit block arranged within a display control circuit to which a coordinate detecting method in accordance with a third embodiment of the present invention is applied in the liquid crystal display unit having the first construction;

FIG. 10 is a timing chart showing timings of main signals in the circuit block shown in FIG. 9;

FIG. 11 is an explanatory view schematically showing a scanning operation in a row direction in the liquid crystal display unit using the general technique;

FIG. 12 is an explanatory view schematically showing a scanning operation in a row direction in a coordinate detecting method in accordance with a first embodiment of the present invention in a liquid crystal integral type tablet having a second construction of the present invention;

FIG. 13 is a timing chart showing timings of main signals in the coordinate detecting method in the first embodiment of the present invention in the liquid crystal integral type tablet having the second construction;

FIG. 14 is a block diagram showing an electric construction of the liquid crystal integral type tablet to which the coordinate detecting method in the second embodiment is applied in the second construction of the present invention;

FIG. 15 is an explanatory view schematically showing a scanning operation in a row direction in the coordinate detecting method in the second embodiment of the present invention in the liquid crystal integral type tablet having the second construction; and FIG. 16 is a timing chart showing timings of main signals in the coordinate detecting method in the second embodiment of the present invention in the liquid crystal integral type tablet having the second construction.

DESCRIPTION OF THE PREFERRED EMBODIMENTS

The preferred embodiments of coordinate detecting methods in a liquid crystal display unit and a liquid crystal integral type tablet in the present invention will next be described in detail with reference to the accompanying drawings.

A coordinate detecting method in accordance with a first embodiment of the present invention is applied to a liquid crystal display unit having a first construction of the present invention. An entire construction of the liquid crystal display unit using the coordinate detecting method is approximately equal to that shown in FIG. 1. A display control circuit 9 partially uses an existing circuit constructed such that no coordinates are detected. Therefore, the display control circuit 5 is constructed such that a first display control signal providing a display period for all portions of one frame is generated within the display control circuit 5. Further, image data are transmitted in accordance with timings shown by the first display control signal.

FIG. 6 shows the electric construction of a circuit block arranged within the display control circuit 5. Signals are processed with respect to the first display control signal and the image data transmitted in accordance with this first display control signal. In FIG. 6, the same signals as the liquid crystal display unit using the general technique are designated by the same reference numerals as FIG. 1.

In FIG. 6, the first display control signal generated by an existing circuit is constructed by signals Sa, CP1a and CP2a. These signals are signals for controlling a display in which all portions of one frame constitute a display period. Signals D0a to D3a show the image data transmitted in accordance with timings of the first display control signal.

A clock generating circuit 26 as a circuit block generates a second display control signal (constructed by signals S, CP1 and CP2) on the basis of the first display control signal. The second display control signal is provided in a display period for displaying an image onto a liquid crystal panel 1 and a non-display period in which no image is displayed on the liquid crystal panel 1.

A line address counter A23 and a clock counter A24 are circuit blocks for generating write addresses of frame memories A21 and B22. A line address counter B27 and a clock counter B28 are circuit blocks for generating read addresses of these memories. The write and read addresses are transmitted to the frame memories A21 and B22 through address sectors 29 and 32.

The image data (signals D0a to D3a) transmitted in accordance with timings of the first display control signal are transmitted to the frame memories A21 and B22 through data selectors 30 and 31. The frame memories A21 and B22 transmit image data (signals D0 to D3) through data selectors 30 and 31 in accordance with timings of the second display control signal.

The frame memories A21 and B22 constitute a memory pair. When one of the frame memories A21 and B22 stores the image data transmitted in accordance with timings of the first display control signal, the other transmits the stored image data in accordance with timings of the second display control signal.

A memory switching circuit 25 as a circuit block generates a control signal for controlling switching operations of the address selectors 29, 32 and the data selectors 30, 31.

FIG. 7 is a timing chart showing timings of main signals in circuit blocks in the above circuit construction. Operations of the circuit blocks of the liquid crystal display unit shown in FIG. 6 will next be explained with reference to FIG. 7 in accordance with necessity.

As shown in FIG. 7, the first display control signal (signals Sa, CP1a and CP2a) is a control signal having no non-display period. The number of clock signals in one frame of the signal CP1a is equal to the number of row electrodes Y1 to Yn of the liquid crystal panel 1 and is therefore a row electrode number n.

The non-display period according to αlines is generated by conversion to the number of lines as rows of the row electrodes Y1 to Yn on the basis of this first display control signal. However, no frame frequency is changed in this case. Therefore, a display speed is increased. Accordingly, no image data transmitted in accordance with the first display control signal (signals Sa, CP1a and CP2a) can be used as they are. Therefore, it is necessary to increase a transfer speed of the image data. However, a margin period can be obtained within a frame by increasing the transfer speed (increasing a display speed of an image). This margin period is set to a non-display period for detecting coordinates.

In a method for realizing these contents, image data of one frame are stored to the frame memory A21 or B22 and the stored image data are read from this frame memory in the next frame in accordance with timings of the second display control signal (signals S, CP1 and CP2).

With respect to the timings of FIG. 7, image data of each of frames (N+1) and (N+1) are stored to the frame memory A21 and image data of frame N are stored to the frame memory B22.

At a writing time of the image data, a write address is set by transmitting outputs of the line address counter A23 and the clock counter A24 through the address sector 29. The line address counter A23 counts the number of lines based on the signals Sa and CP1a. The clock counter A24 counts the number of clock signals for the signal CP2a. The image data (signals D0a to D3a) are transmitted as write data through the data selector 30. When the frame memory A21 is operated in a writing period, the frame memory B22 is operated in a reading period.

When the above frame (N−1) is terminated, the memory switching circuit 25 sets an operating state of the frame memory A21 to a reading state by controlling operations of the address selectors 29, 32 and the data selectors 30, 31. The memory switching circuit 25 also sets an operating state of the frame memory B22 to a writing state.

In the N-th frame, the operating state of the frame memory A21 is set to a reading state. Further, outputs of the line address counter B27 and the clock counter B28 are transmitted as a reading address through the address selector 29. A clock signal transmitted to the line address counter B27 and the clock counter B28 for generating this reading address is set to a clock signal for the second display control signal (signals S, CP1 and CP2).

These signals will next be explained in detail. The signal S is equal to the signal Sa since a frame period of the signal S is equal to that of the signal Sa. In contrast to this, α lines are added to the number of lines with respect to the signals CP1 and CP2. Accordingly, a clock frequency of the signal CP1 is set to a frequency multiplied by (N+α)/N in accordance with this addition. A clock frequency of the signal CP2 is set to a value in a range satisfying the following condition.

Period of signal CP1a≧(period of signal CP2×the number of column electrodes/the number of data bits)

In this condition, the number of data bits is equal to the number of bits transferred by one clock signal for the signal CP2a and is concretely set to a value 4.

Accordingly, in the N-th frame, image data of the (N−1) -th frame stored to the frame memory A21 are sequentially read therefrom in timings according to the second display control signal through the data selector 30 and are outputted as signals D0 to D3.

Further, in the N-th frame, the operating state of the frame memory B22 is set to a writing state and outputs of the line address counter A23 and the clock counter A24 based on timings of the first display control signal are given as a write address.

As mentioned above, writing and reading relations of the frame memories A21 and B22 are alternated every frame. Therefore, an image displayed on the liquid crystal panel 1 is set to an image delayed by one frame so that a non-display period is secured as a result.

In the secured non-display period, coordinates are detected by the detecting pen 8 in a method similar to the coordinate detecting method according to the general technique.

The above explanation relates to the coordinate detecting method in the first embodiment of the present invention. A coordinate detecting method in accordance with a second embodiment of the present invention will next be explained. This coordinate detecting method in the second embodiment is a method for increasing a coordinate detecting speed by integer times in comparison with the first embodiment by approximately using the same method as the coordinate detecting method in the first embodiment.

Figure 1:
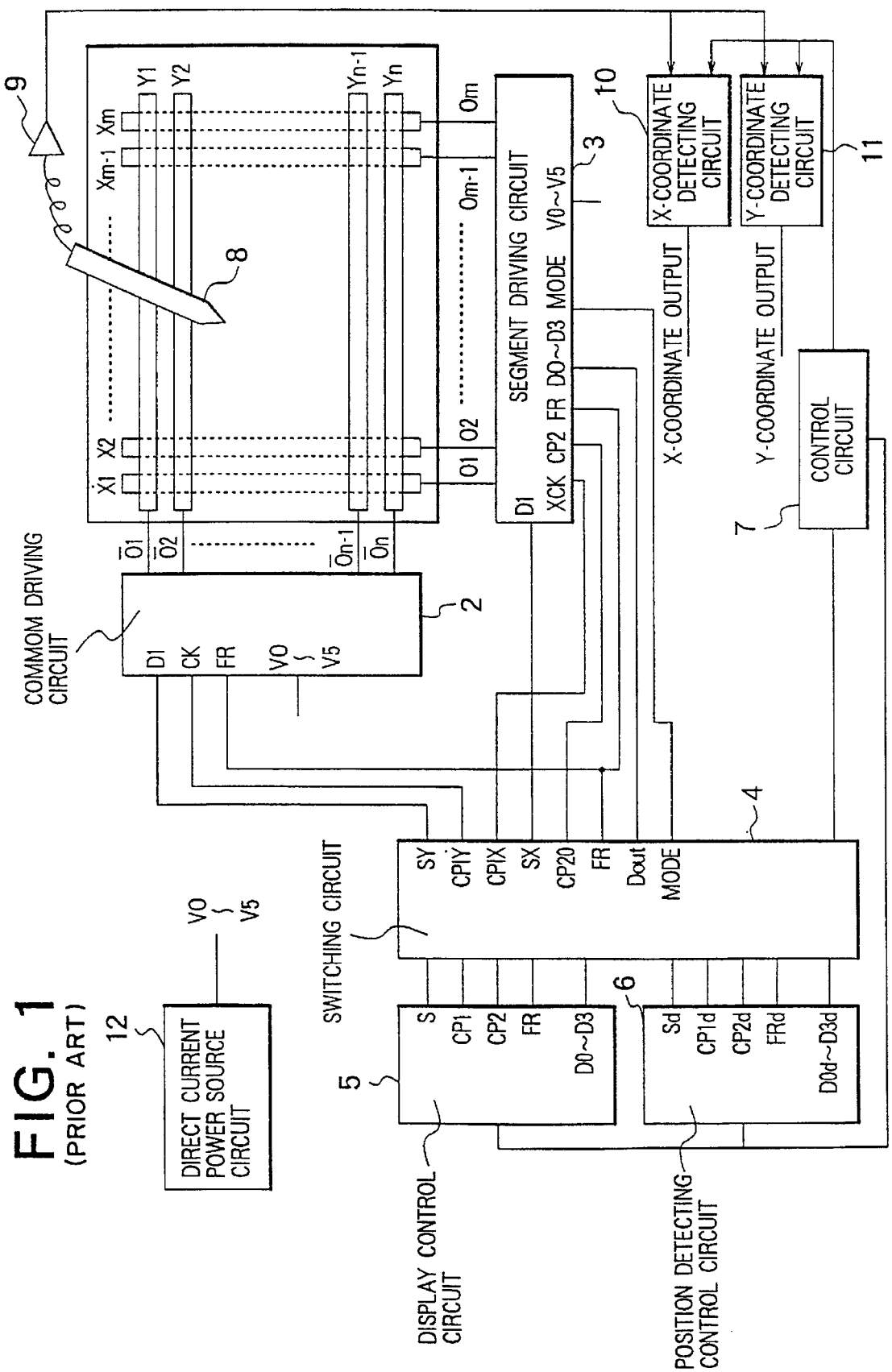
FIG. 1 is a block diagram showing the electric construction of a liquid crystal display unit in accordance with a general technique.
Figure 2:
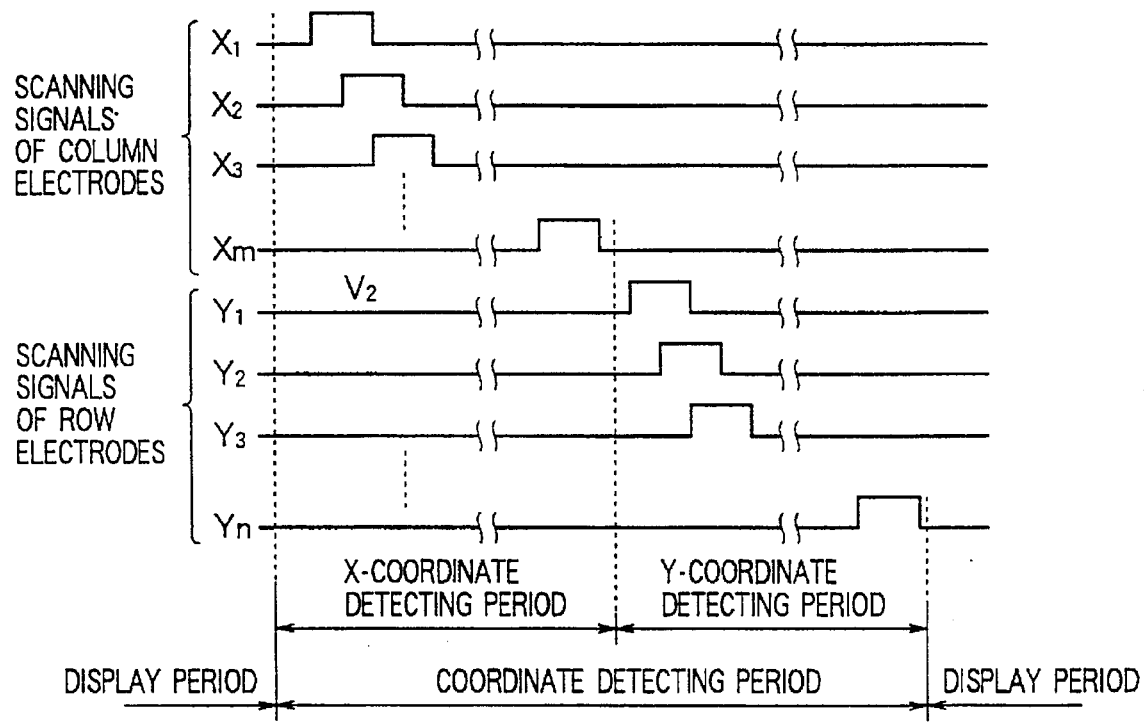
FIG. 2 is a typical view showing an electrode scanning operation of the liquid crystal display unit using the general technique when coordinates are detected.

The entire construction of a liquid crystal display unit using this coordinate detecting method in the second embodiment is also approximately equal to that shown in FIG. 1. A display control circuit 5 uses an existing circuit constructed such that no coordinates are detected. Therefore, the display control circuit 5 is constructed such that a first display control signal providing a display period for all portions of one frame is generated within the display control circuit 5.

The display control circuit 5 has the circuit construction shown in FIG. 6. However, in the second embodiment, the construction of a clock generating circuit 26 is slightly changed. Namely, a frequency of each of signals S and CP1 is set to be twice as integer times in comparison with the first embodiment.

Therefore, as shown by the timing chart of FIG. 8, image data stored to a frame memory A21 or B22 are read twice therefrom in one frame period of the first display control signal. A non-display period is formed to detect coordinates by the detecting pen 8 after termination of each of display periods. Therefore, the number of coordinate detections in one frame is doubled so that a coordinate detecting speed is similarly doubled.

In the case of the above change in the construction of the clock generating circuit 26 with respect to the first embodiment, it is sufficient to change only the clock generating circuit 26 when the above frequency is allowed by characteristics of each of circuit blocks such as access times of the frame memories A21 and B22, etc.

The explanation of the coordinate detecting method in the second embodiment has thus been terminated.

A coordinate detecting method in accordance with a third embodiment of the present invention will next be explained.

Features of the first embodiment will first be described before the third embodiment is explained. In the circuit construction shown in FIG. 6 and using the coordinate detecting method in the first embodiment, two sets of a line address counter and a clock counter are required and two sets of frame memories are also required so that this circuit construction is large-sized. Therefore, in the third embodiment, the circuit construction using the present invention is further simplified in comparison with the first embodiment such that this circuit construction can be assembled into various kinds of devices.

FIG. 9 shows the electric construction of a circuit block to which the third embodiment is applied. This electric block is arranged within a display control circuit 5. In FIG. 9, the same signals as the liquid crystal display unit according to the general technique shown in FIG. 1 are designated by the same reference numerals as FIG. 1.

The above circuit block is schematically set to a signal processing block for processing signals with respect to a first display control signal (signals Sa, CP1a and CP2a) and image data (signals D0a to D3a) transmitted in accordance with the first display control signal.

In FIG. 9, the construction of a clock generating circuit 34 is approximately equal to that of the above clock generating circuit 26. Accordingly, the clock generating circuit 34 generates a second display control signal (signals S, CP1 and CP2) based on the first display control signal (signals Sa and CP1a).

In this case, a non-display period is formed on the first half side of a frame. Accordingly, the signal S rises after α added clock signals are transmitted to the signal CP1. Further, no clock signal is transmitted to the signal CP2 in the non-display period.

A first-in first-out memory (FIFO memory) 33 is a memory for reading data in a writing order of these data without using address control from the exterior of this memory. Namely, the FIFO memory 33 stores image data (signals D0a to D3a) transmitted according to timings of the first display control signal in accordance with a clock signal for the signal CP2a provided as an input clock signal. With respect to the stored image data, the FIFO memory 33 transmits image data (signals D0 to D3) according to timings of the second display control signal in accordance with a clock signal for the signal CP2 provided as an output clock signal.

FIG. 10 is a timing chart showing timings of main signals in a circuit block having the above construction. An operation of the circuit block shown in FIG. 9 will next be explained with reference to FIG. 10 in accordance with necessity.

A non-display period corresponding to α lines is formed at a starting time of each of frames. Accordingly, in this non-display period, coordinates are detected by using the detecting pen 8 in a method similar to the coordinate detecting method in accordance with the general technique. However, image data (signals D0a to D3a) are transmitted in accordance with the first display control signal (signals Sa, CP1a and CP2a) even in this non-display period. Accordingly, these image data are stored to the FIFO memory 33.

When the non-display period is terminated, image data (signals D0 to D3) are outputted from the FIFO memory 33 in the same order as a data storing order in accordance with timings of the second display control signal (signals S, CP1 and CP2). Therefore, when a display period is started, the image data are sequentially outputted from the FIFO memory 33 in an order of image data on a first line, image data on a second line and so on. The outputted image data are displayed on a liquid crystal panel 1.

Therefore, in the FIFO memory 33, the inputted image data are immediately outputted in a final frame. This means that an amount of the image data stored to the FIFO memory 33 is maximized at a starting time of the display period. Therefore, it is not necessary for the FIFO memory 33 to store image data of one frame and it is sufficient to set a capacity of the FIFO memory 33 such that the above maximum amount of the image data can be stored to the FIFO memory 33. Namely, it is sufficient for the FIFO memory 33 to have a relatively small memory capacity.

The explanation of the third embodiment of the present invention has been thus terminated. The next description relates to a coordinate detecting method in accordance with a first embodiment of the present invention in a liquid crystal integral type tablet having a second construction of the present invention. A general technique relative to the second construction of the present invention and the first embodiment of the present invention in the second construction will first be explained schematically again.

In the general technique shown in FIG. 11, the liquid crystal display unit displays an image by a continuous scanning operation of row electrodes Y1 to Yn and detects coordinates by the continuous scanning operation in a non-display period during one frame. Namely, the number of frames and the number of coordinate detections are set in one-to-one correspondence. Therefore, it is necessary to increase a frame frequency to increase a coordinate detecting speed.

When the number of row electrodes Y1 to Yn of the liquid crystal panel 1 is increased, a period of the signal CP1 is shortened and a duty ratio of a display is increased. Therefore, it is considerably difficult to set the frame frequency to be integer times so as to increase the coordinate detecting speed.

In contrast to this, coordinates are detected plural times within one frame in the coordinate detecting method according to the second construction of the present invention. However, as shown in FIG. 12, coordinates are detected twice in the first embodiment of the present invention.

First, row electrodes Y1 to Yn ranged from 1 to n are divided into two electrode groups composed of a group of continuous row electrodes Y1 to Yk ranged from 1 to k and a group of continuous row electrodes Yk+1 to Yn ranged from k+1 to n. As shown in FIG. 12, when an image is displayed by the group of row electrodes Y1 to Yk, this display is temporarily stopped. After a common pulse corresponding to the row electrode Yk is then transmitted at a high speed, coordinates are detected by scanning all the row electrodes Y1 to Yn.

When the coordinate detection is terminated, the common pulse is moved at a high speed until a position corresponding to the row electrode Yk+1. Thereafter, an image is displayed by using the group of row electrodes Yk+1 to Yn. When this display is terminated, coordinates are again detected.

Namely, coordinates are detected twice in one frame by transmitting the common pulse at a high speed and resetting the common pulse during the image display.

The coordinate detecting method in the first embodiment in the liquid crystal integral type tablet according to the second construction of the present invention is realized by slightly changing a circuit block portion illustrated by the block diagram of FIG. 1 showing the general technique. Accordingly, this coordinate detecting method will next be explained with reference to the block diagram shown in FIG. 1 and the timing chart shown in FIG. 13.

As already explained, the coordinate detecting method in the first embodiment in the second construction of the present invention is constructed such that coordinates are detected twice within one frame. Therefore, the row electrodes Y1 to Yn are divided into two electrode groups composed of a group of row electrodes Y1 to Yk and a group of row electrodes Yk+1 to Yn. Further, a display period is divided into a divisional display period provided by the row electrode group Y1 to Yk and a divisional display period provided by the row electrode group Yk+1 to Yn. A non-display period for detecting coordinates is inserted between these divisional display periods.

Concretely, as shown in FIG. 13, α clock signals P1 are added to a signal CP1 in the non-display period between the divisional display period provided by the row electrode group Y1 to Yk and the divisional display period provided by the row electrode group Yk+1 to Yn. Similar to the general technique, a non-display period for detecting coordinates is formed after the divisional display period provided by the row electrode group Yk+1 to Yn is terminated. This non-display period is shown by β clock signals P2.

When the display period of the row electrode group Y1 to Yk is terminated, a switching circuit 4 transmits one clock signal P3 to a signal CP1X. Thereafter, the switching circuit 4 sets a coordinate detecting mode with the voltage level of a signal MODE as a high voltage level. When this coordinate detecting mode is started, (n−k+1) high speed clock signals P4 are transmitted to a signal CP1Y and a common pulse is removed from the row electrodes Y1 to Yn. Thereafter, Y and X coordinates are detected. Namely, first coordinates are detected in one frame.

When the coordinate detection is terminated, transfer of image data for the row electrode Yk+1 is started to display an image. When this transfer is terminated and a clock signal P5 is transmitted to the signal CP1X, an image is displayed in the row electrode Yk+1. Therefore, it is necessary to locate a common pulse in the row electrode Yk+1 when the clock signal P5 is transmitted. Therefore, a pulse P6 having one clock width at a high voltage level thereof is transmitted to a signal SY and k+1 high speed clock signals P7 are transmitted to the signal CP1Y. A terminating time of the transmission of the clock signals P7 is equal to a transmitting time of the clock signal P5.

The display period provided by the row electrode group Yk+1 to Yn is started by the above operation so that an image is displayed until the row electrode Yn. Similar to the general technique, the non-display period is started and coordinates are detected when this image display is completed.

Clock signals for transmitting and setting the common pulse and transmitted to the signal CP1Y are set to be equal to each other. The value k can be set to an arbitrary value. Further, the coordinate detecting method can be constructed such that three or four non-display periods are formed.

In the above-mentioned first embodiment, a predetermined operation of the common driving circuit 2 can be performed irrespective of the construction thereof. In this case, it is necessary to transmit and reset a common pulse. However, when the common driving circuit 2 is constructed by cascade connections of plural integrated circuits, the common driving circuit 2 can be constructed such that it is not necessary to transmit and reset the common pulse.

The second embodiment in the second construction of the present invention is an embodiment in which it is not necessary to transmit and reset the common pulse. FIG. 14 shows the electric construction of a liquid crystal integral type tablet to which this second embodiment is applied.

The following description relates to differences between this liquid crystal integral type tablet in the second embodiment and the liquid crystal integral type tablet to which the first embodiment is applied.

First, the construction of a switching circuit 4c is slightly changed so that a signal transmitted from the switching circuit 4c is slightly different from that in the first embodiment. Further, a common driving circuit 2 is constructed by cascade connections of two circuit blocks composed of common driving circuits 2a and 2b.

Each of these common driving circuits 2a and 2b is constructed by an independent integrated circuit. A common pulse can be separately set by each of signals SY0 and SY1. The common driving circuit 2a transmits a control output with respect to a group of row electrodes Y1 to Yk. The common driving circuit 2b transmits a control output with respect to a group of row electrodes Yk+1 to Yn.

FIG. 15 is an explanatory view schematically showing an operation of the liquid crystal integral type tablet in the second embodiment. FIG. 16 is a timing chart showing detailed timings of this liquid crystal integral type tablet. In FIG. 16, an output of a display control circuit 5 is omitted, but has the same signal shape as the display control circuit 5 shown in FIG. 13.

In this second embodiment, the detection of coordinates is started immediately after an image is displayed with respect to the row electrode group Y1 to Yk as schematically shown in FIG. 15. When the coordinate detection is terminated, an image is displayed with respect to the row electrode group Yk+1 to Yn and coordinates are then detected.

In a detailed explanation, a first operation of the liquid crystal integral type tablet in each of frames is set to a display using the row electrode group Y1 to Yk. Therefore, an operation of the row electrode group Y1 to Yk is controlled by the common driving circuit 2a by using signals SY0 and CP1Y. When this display is terminated, the voltage level of a signal MODE is set to a high voltage level so that a period for detecting coordinates is indicated. Then, a first coordinate detection is performed.

First, a Y-coordinate is detected in the first coordinate detection. At this time, it is necessary to scan all row electrodes Y1 to Yn. Accordingly, it is necessary to apply a voltage for this detection to both the common driving circuits 2a and 2b.

Therefore, a voltage level of the signal SY0 is first set to a high voltage level. Simultaneously, a high speed clock signal is transmitted to the signal CP1Y. A width of the signal SY0 at this high voltage level is determined in accordance with the number of overlapped row electrodes. When k clock signals are transmitted to the signal CP1Y, it is necessary to subsequently operate the common driving circuit 2b so that the voltage level of a signal SY1 is set to a high voltage level. A width of the signal SY1 at this high voltage level is set to be equal to the width of a signal at a high voltage level transmitted to the signal SY0. Thereafter, [(the number of clock signals showing the width of the signal SY0 at the high voltage level)+(n−k)+1] clock signals are transmitted to the signal CP1Y.

The scanning operation is completely performed by the above operation with respect to all the row electrodes Y1 to Yn, and a Y-coordinate is then detected. An X-coordinate is next detected. A method for detecting this X-coordinate is similar to that in the first embodiment. Accordingly, an explanation of this detecting method is omitted in the following description.

When the first coordinate detection is terminated, a display using the row electrode group Yk+1 to Yn is started. At this time, the voltage level of the signal SY1 is set to a high voltage level and a clock signal is transmitted to the signal CP1Y so that a common pulse is set in the common driving circuit 2b. When the display is then terminated until the row electrode Yn, a second coordinate detection is started. The operation of the liquid crystal integral type tablet in this second coordinate detection is equal to that in the first coordinate detection. Accordingly, this operation is omitted in the following description.

As mentioned above, in the coordinate detecting method in this second embodiment, coordinates are detected twice in one frame since the common driving circuit 2 is divided into two circuit blocks of common driving circuits 2a and 2b. Therefore, when the common driving circuit 2 is divided into three circuit blocks or more, the coordinate detecting method can be constructed such that coordinates are detected three times or more in one frame.

In a first construction of the present invention, a coordinate detecting method in a liquid crystal display unit comprises the steps of generating a second display control signal for controlling a display provided in a display period and a non-display period on the basis of a first display control signal set such that one frame is constructed by only the display period; the display period and the non-display periods being set such that an image is displayed on a liquid crystal panel in the display period and is not displayed on the liquid crystal panel in the non-display period; storing transmitted image data to a memory in accordance with timings shown by the first display control signal; reading these stored image data from the memory in accordance with timings shown by the second display control signal; displaying the image on the liquid crystal panel by the read image data and the second display control signal; and detecting coordinates by using a detecting pen in the non-display period. In this first construction, the non-display period is secured by increasing a reading speed of data for displaying an image by using a memory for temporarily storing the image data. The existing construction of a display control circuit can be used as it is by detecting coordinates in the secured non-display period.

In a coordinate detecting method in a liquid crystal integral type tablet having a second construction of the present invention, an image is displayed on a liquid crystal panel and coordinates are detected by a detecting pen when no image is displayed on the liquid crystal panel. The coordinate detecting method comprises the steps of dividing row electrodes arranged in the liquid crystal panel into a plurality of electrode groups constructed by continuous row electrode groups; forming a non-display period for undisplaying the image on the liquid crystal panel every time a display period for displaying the image by the electrode groups is terminated; and detecting coordinates by the detecting pen in this non-display period. In this second construction, a coordinate detecting speed can be increased by setting a plurality of coordinate detecting periods within one frame.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for adding a coordinate detecting function in a liquid crystal display unit having only an image displaying function, comprising the steps of:

generating a second display control signal including a display period and a non-display period alternately on the basis of a first display control signal including only a display period for displaying a frame of imaging data, a sum of the duration of said display period and said non-display period of said second control signal being equal to the duration of said display period of said first control signal;

the display period and the non-display periods being set such that an image is displayed on a liquid crystal panel in the display period and is not displayed on said liquid crystal panel in the non-display period;

storing transmitted image data to a memory in accordance with timings shown by said display period of said first display control signal;

reading these stored image data from the memory in accordance with timings shown by said second display control signal;

displaying read out image data on said liquid crystal panel in said display period of said second display control signal; and detecting coordinates of a coordinate indicate means in said non-display period of said second control signal.

2. The method according to claim 1, wherein said memory includes a first frame memory and a second frame memory and at the storing step, one of the first frame memory and the second frame memory stores the frame of imaging data, alternately.

3. The method according to claim 1, wherein said memory is a first-in first-out memory.

4. A coordinate detecting method in a liquid crystal integral type tablet in which an image is displayed on a liquid crystal panel and coordinates indicated by a coordinate indicate means are detected when no image is displayed on said liquid crystal panel;

the coordinate detecting method comprising the steps of:

dividing row electrodes arranged in said liquid crystal panel into a plurality of electrode groups constructed by continuous row electrode groups;

dividing a display period for displaying a frame of image data into a plurality of display periods each displaying a part of the image data on respective one of said plurality of electrode groups;

forming a non-display period for undisplaying the image on said liquid crystal panel at every interval of said plurality of display periods; and detecting coordinates of said coordinate indicate means in said non-display period so as to detect the coordinates a plurality of times within the display period for displaying the frame of image data;

wherein a common pulse for displaying one of said electrode groups is removed after the display period corresponding to said one of said electrode groups is completed, and a common pulse for displaying next one of said electrode groups is applied prior to the display period for said next one of said electrode groups in order to drive said plurality of electrode groups by a single common driving circuit.

5. The method according to claim 4, wherein said row electrodes are divided into two groups.

6. An apparatus including a liquid crystal display unit having a circuit for generating a first control signal including only a display period for displaying a frame of image data, and a display circuit for displaying the frame of data in accordance with said first control signal, and a coordinate indicate means, said apparatus comprising:

a detecting circuit for detecting coordinates of said coordinate indicate means;

a generating circuit for generating a second control signal including a display period and a non-display period from said first control signal, a sum of the duration of said display period and said non-display period of said second control signal being equal to the duration of said display period of said first control signal;

a memory means for storing the frame of image data; and a control circuit for controlling said memory means to read out the stored image data in shorter time than storing time, said display circuit to display the read out image data in said display period of said control signal, and said detecting circuit to detect the coordinates of said coordinate indicate means in said nondisplay period of said control signal.

7. An apparatus according to claim 6, wherein said memory means includes a first frame memory and a second frame memory for storing the frame of image data, alternately.

8. An apparatus according to claim 6, wherein said memory means is a first-in first-out memory.

9. A coordinate detecting apparatus with a liquid crystal display unit and a coordinate indicate means, comprising:

a single common driving circuit for driving row electrodes of the liquid crystal display unit, said row electrodes being divided into a plurality of groups;

a segment driving circuit for driving column electrodes of the liquid crystal display unit;

a display control circuit for controlling the liquid crystal display unit in a display period for displaying a frame of image data;

a detecting circuit for detecting coordinates of the coordinate indicate means in a non-display period; and a control circuit for controlling said display period and said non-display period, said display period being divided into a plurality of periods each corresponding to one of said groups of said row electrodes, and said control circuit controlling said non-display period to be inserted at every interval of said plurality of periods so as to detect the coordinates a plurality of times within the display period for displaying the frame of image data, wherein said control circuit applies a signal for removing a common pulse for displaying one of said electrode groups after the display period corresponding to said one of said electrode groups is completed, and said control circuit applies a signal for setting a common pulse for displaying next one of said electrode groups prior to the display period for said next one of said electrode groups in order to drive said plurality of electrode groups by said single common driving circuit.

10. An apparatus according to claim 9, wherein said row electrodes are divided into two groups.

* * * * *